(12) United States Patent
Kogan et al.

(10) Patent No.: US 8,654,369 B2
(45) Date of Patent: Feb. 18, 2014

(54) SPECIFIC PRINT DEFECT DETECTION

(75) Inventors: Hadas Kogan, Zichron Yaakov (IL); Hila Nachlieli, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 293 days.

(21) Appl. No.: 13/185,226

(22) Filed: Jul. 18, 2011

(65) Prior Publication Data

US 2013/0021637 A1     Jan. 24, 2013

(51) Int. Cl.
    G06F 15/00   (2006.01)
    G06K 1/00    (2006.01)
    G06K 15/00   (2006.01)
    H04N 1/00    (2006.01)

(52) U.S. Cl.
    USPC .......................................... 358/1.14; 358/1.6

(58) Field of Classification Search
    None
    See application file for complete search history.

(56) References Cited

U.S. PATENT DOCUMENTS 8,126,252 B2 *    2/2012  Abernethy et al. ........... 382/139
2011/0149331 A1 * 6/2011  Duggan et al. ............... 358/1.14

OTHER PUBLICATIONS

Van, Schein, Staelin, Kisilev, Simske, Dagan and Harush, "Automatic Visual Inspection and Defect Detection on Variable Data Prints" (Jun. 21, 2010).

* cited by examiner

Primary Examiner — Douglas Tran

(57) ABSTRACT

An apparatus and method detect defects in a captured image of output from a printing device. The captured image is filtered using a source image for the output, wherein specific defects of interest are detected using the filtered image.

20 Claims, 8 Drawing Sheets

SPECIFIC PRINT DEFECT DETECTION

BACKGROUND

The automated detection of specific print defects, such as bands and streaks with current general defect detection methods is sometimes unreliable due to such factors as the low contrast nature of such specific defects and the high threshold of existing general defect detection methods set to avoid false detections of print and scan deformations as print defects. The unreliability of automated general defect detection methods is further exacerbated by dust particles that may lie upon detection sensors. As a print medium passes under detection sensors dust particles may cause thin vertical lines on the scanned image that don't appear on the printed page. This may result in an incorrect indication of a print defect.

DETAILED DESCRIPTION OF THE EXAMPLE EMBODIMENTS

Figure 1:
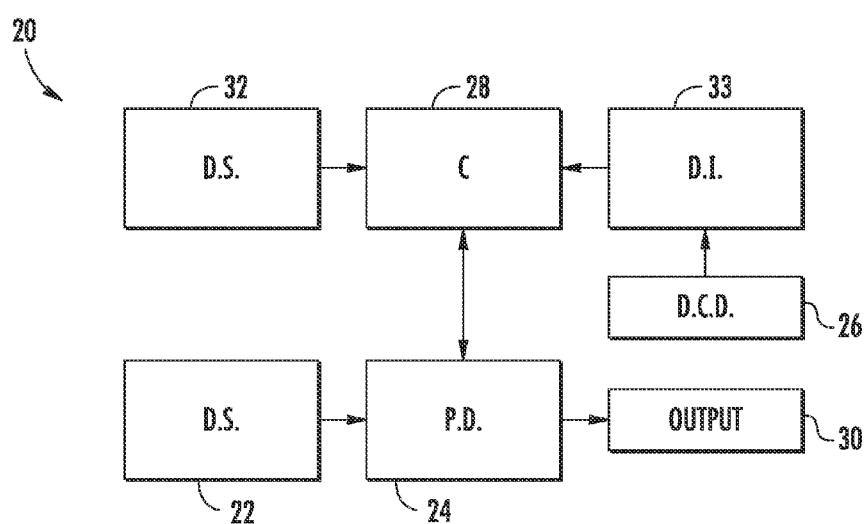
FIG. 1 is a schematic diagram of a printing system according to an example embodiment.

FIG. 1 schematically illustrates printing system 20 according to an example embodiment. As will be described hereafter, printing system 20 is configured to print output based upon a digital source and thereafter automatically detect and provide alerts regarding focused upon specific print defects such as bands and streaks while avoiding unreliability caused by dust particles. Printing system 20 comprises media supply 22, print device 24, digital capture device 26 and controller 28.

Media supply 22 comprises one or more structures configured to supply print media to print device 24. Print media includes any substrate upon which images are printed or by print device 24. Examples of print media include, but are not limited to, fiber-based material, polymeric materials or other materials. In one embodiment media supply 22 comprises a mechanism configured to supply a continuous web or roll of print media to and across print device 24. In another embodiment, need to supply 22 supplies individual sheets of print media to and across print device 24.

Print device 24 comprises one or more device configured to deposit printing material upon the print media supplied by media supply 22. Examples of printing material include, but are not limited to, inks, toners, or other printing materials. Print device 24 applies the print material so as to form a pattern, image or layout of print material upon the print media to form output 30. Print device 24 applies or deposits the print material based upon or in response to control signals from controller 28 which are in turn based upon a digital source image or file (digital source) 32. In one embodiment, print device 24 may comprise one or more drop-on-demand inkjet printheads. In another embodiment, print device 24 may comprise one or more electrophotographic (laser) or liquid electrophotographic (LEP) print devices.

Digital capture device 26 comprises a device in line with output 30 that is configured to digitally capture a digital image (S) of a face of output 30 having the print material. In one embodiment, digital capture device 26 comprises an in-line scanner. In other devices, cameras or other digital devices may be used. As shown by FIG. 1, digital capture device 26 outputs a digital image 33 of output 30 and transmits the digital image 33 to controller 28.

Controller 28 comprises one or more controllers or one or more processing units configured to receive or otherwise acquire digital source 32, to generate control signals causing print device 24 to print output 30 based upon digital source 32, to carry out a comparison of digital source 32 and digital image 33 to detect defects in digital image 33 and to cause an operator or automatic defect cause correction device (which corrects the source or cause of the defect) to be alerted of detected print defects while avoiding alerts when a defect is determined to be a scanning or digital capture defect. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 28 may be embodied as part of one or more application-specific integrated circuits (ASICs). Unless otherwise specifically noted, the controller is not limited to any specific combination of hardware circuitry and software, nor to any particular source for the instructions executed by the processing unit.

In one embodiment, a print device 24 and controller 28 are embodied as a single unit, such as a single printer, while the digital capture device 26 is a separate unit distinct from the printer. For example, in such an embodiment, the single printer may be configured to receive digital source 32 and print output 30 based upon digital source 32. In one embodiment, print device 24, digital capture device 26 and controller 28 are embodied as a single unit, such as a single printer with print defect detection. In yet other embodiments, the functions of controller 28 may just be distributed amongst multiple processing units. For example, in one embodiment, a printer may include a first processing unit while a host computing device may include a second processing unit, wherein the two processing units cooperate to carry out the functions of controller 28. In such an embodiment, the first processing unit of the host computing device may receive digital source 32, via a portable memory device or via a wired or wireless intranet or Internet connection, wherein the first processing unit transmits control signals generated based upon the digital source 32 to the second processing unit of the print device 24 which prints output 30.

When making the comparison of the digital source and the digital image, controller 28: (1) registers the digital source and the digital image; (2) applies at least one defect focused filter, which is based on characteristics of a specific defect of interest, to the registered digital source and digital image to form a filtered image; and (3) compares a function of the filtered image to a predetermined thresh hold to determine existence of the defect of interest. Although the registration performed by controller 28 may not be perfect (the resulting registered images still contain many differences e.g. in detail location and colors), because controller 28 registers the digital source and the digital image for comparison, controller 28 may identify or detect defects of interest in print output from multiple different digital sources. In other words, the defect detection employed by controller 28 works on prints of multiple different digital sources without such defect detection processes having to be customized or dedicated for each digital source or reference from which the output is printed. For example, by registering and comparing the captured digital image and the original digital source or reference image, controller 28 lessons the possibility that an artifact found in both the digital source or reference image and the captured digital image will be mistakenly deemed as print defect without a detect detection method specifically dedicated for the digital source.

Because controller 28 utilizes at least one defect focused filter which is based on characteristics of a specific defect of interest, the filter used by controller 28 is more focused and fine tuned for the specific defect of interest. As a result, controller 28 may be better able to identify a particular defect of interest which otherwise might not be reliably detected by a general defect detection method. In particular, controller 28 may be better able to locate or identify defects of interest which are sometimes obfuscated due to lower levels of contrast between the particular defect of interest and surrounding artifacts in the image, due to low illumination levels or due to other factors. Moreover, controller 28 may be better able to identify such defects of interest while being more resilient to intended image graphics or artifacts which are deceptively close to a print defect. In particular, controller 28 may be better able to discern between actual print defects and image artifacts which are not defects, but may be otherwise mistaken as a print defect. Examples of such one or more filters which are modified based upon characteristics of a particular print defect of interest include, but are not limited to: $<s,f>$, $<r,f>$, $|\cos \Theta_s|$, $|\cos \Theta_r|$, $|\cos \Theta_s|-|\cos \Theta_r|$, distance from nearest edge, local color, local activity (standard deviation), $d1=\min(<s,f>, kC_1)/<r,f>+C_1$ and $d2=\max(|\cos \Theta_s|-|\cos \Theta_r|,0)$, and similar measures of the above characteristics: $2*Fr*Fd/(Fr.^2+Fd.^2+\text{not\_zero\_constant})$ where:

s is a vector representing pixels in the first window of pixels in the digital image;

r is a vector representing pixels in the second window of pixels in the digital source;

f is a vector corresponding to a shape of a defect of interest; $|f|=1$; is the angle between s and f;

$\Theta_s$ is the angle between s and f;

$\Theta_r$ is the angle between r and f;

$C_1$ and k are prefined constants that limit the range of values $d_1$;

$<s,f>$ is an inner product of s and f; and $<r,f>$ is an inner product of r and f.

Fd is the filter/angle/std on r,

Fs is filter/angle/std on s not zero constant is a small constant that prevents the denominator from being zero.

As will be described hereafter, such filters may be modified to focus on either a band or a streak in the printed image, or a false defect, a dust line, in the digital image or scanned image.

In yet other embodiments, one or more the same filters may also be utilized to detect other defects of interest. For example, such filters, when modified, may be utilized to detect defects such as wiper scratches and a defect known as "Dirty IMP Paper/Dry Ink". To detect such defects, a function is applied to the above filters, wherein the sum over Ci*K(x, xi), were one example for K(x,z) is $K(x,z)=w*\exp(-((x-z)*(x-z))/b)$ where i=1:N, x is a feature vector that contains the results of the filters described above, xi are the feature vectors of N examples of defected and clear regions in images, and ai, w, b are parameters extracted using a learning process described in Theodoros Evgeniou, Massimiliano Pontil, Tomaso Poggio, A Unified Framework for Regularization Networks and Support Vector Machines, chapter 4, formula 37 (1999), which is hereby incorporated by reference.

Other functions, such as linear combinations of the above features may also be used. In such linear functions, the coefficients can be learned using one of the many well known linear learning methods e.g. Principle Component Analysis (PCA) and Support Vector Machine (SVM).

According to one embodiment, controller 28 is specifically configured to carry out the comparison of the digital source 32 and the digital image 34 so as to reliably identify or detect each of bands, streaks and dust lines. Bands and streaks are printing errors produced by print device 24. In systems that employ line scanners as the digital capture device 26, dust lines are caused by dust particles residing upon the one or more sensors of digital capture device 26. As a print medium passes under the line scanner, which is an array of sensors, each sensor scans a vertical line in the scanned page. A dust particle that lies on one sensor "hides" the image from that sensor causing a usually white line. Such dust lines, if not properly detected, may be misidentified as streaks, causing a false alarm or false indication of a print defect.

Figure 2:
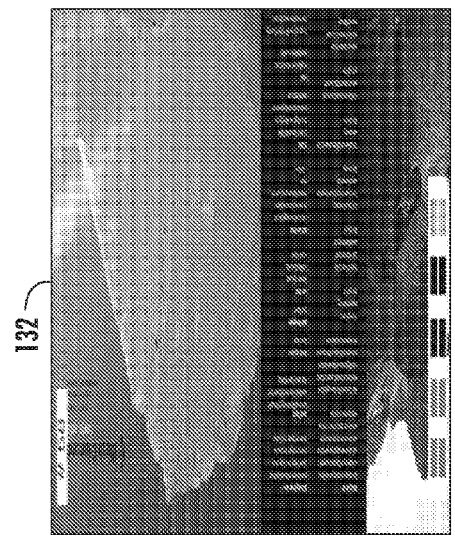
FIG. 2 is an example of a first source image from which a first output is printed.
Figure 3:
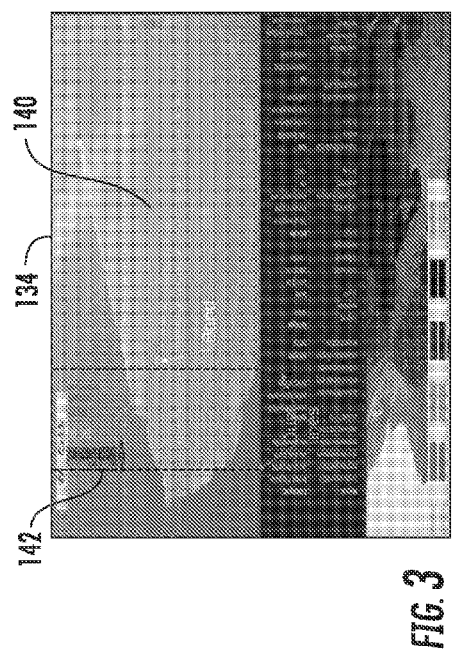
FIG. 3 is an example of a first captured digital image of the first output illustrating the occurrence of an example band and the occurrence of example dust lines.

FIGS. 2-5 illustrate examples of such bands, streaks and dust lines detected by print system 20. FIG. 2 illustrates one example of a digital source 132 while FIG. 3 illustrates an example of a captured digital image 134 of printed output which was based upon the digital source 132. As shown by FIG. 2, digital image 134 includes both a band 140 and several dust lines 142. As noted above, band 140 exists in both digital image 133 and the actual printed output 30 whereas dust lines 142 do not exist on the printed output 30, but merely exist in the digital image 133.

Figure 4:
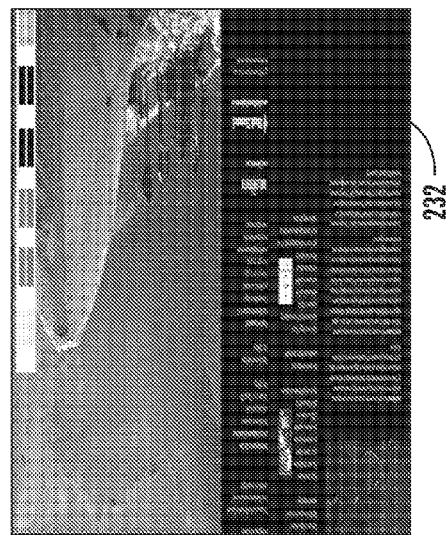
FIG. 4 is an example of a second source image from which a second output is printed.
Figure 5:
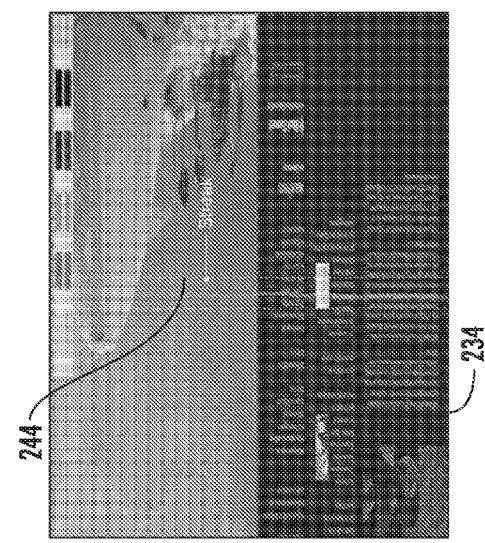
FIG. 5 is an example of a second captured digital image of the second output illustrating the occurrence of an example streak.
Figure 6:
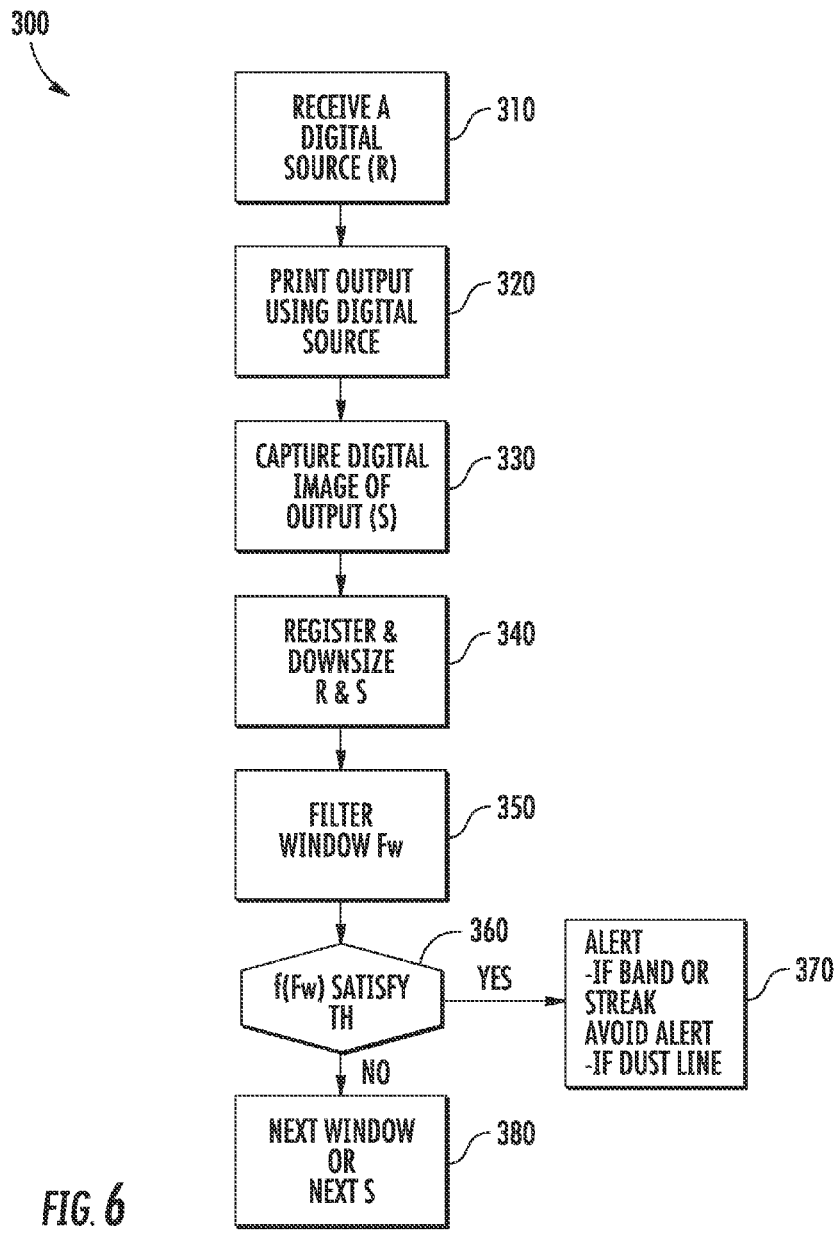
FIG. 6 is a flow diagram of a method for detecting a defect according to an example embodiment.

FIGS. 4 and 5 illustrate a streak print defect. FIG. 4 illustrates the source digital image 232 while FIG. 5 illustrates an example of a captured digital image 234 of printed output which was based upon the digital source 232. As shown by FIG. 5, digital image 234 illustrates a streak 244 which is part of digital image 234 because the printed output 30 included the same streak 244.

Figure 7:
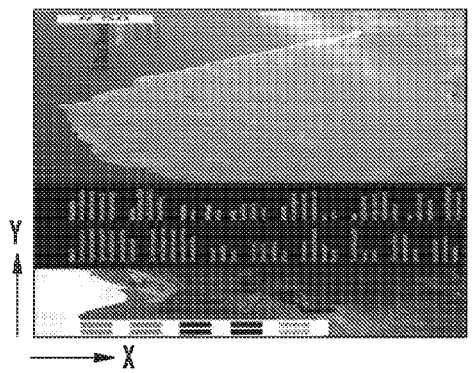
FIG. 7 illustrates an example of the first captured digital image of FIG. 3 converted to grayscale.

FIGS. 6-10 illustrate an example process or method 300 carried out by print system 20 to identify a print defect such as band 140, streak 244 and dust lines 142. As indicated by block or step 310, controller 28 receives digital source (R) 32. As indicated by step 320, print device 24 prints output 30 using or based upon digital source 32. As indicated by step 330, digital capture device 26 captures a digital image 33 of output 30. In one embodiment, each of these steps may be automatically performed under the control of the one or more controllers 28. In another embodiment, one or more such actions may be in response to manual or operator input of commands initiating such steps. As shown by FIG. 7, because the visual differences or defects of interest generally appear as luminance changes, the detection of such defects by controller 28 is carried out using grayscale images. As a result, processing load is reduced.

Figures 8A, 8B:
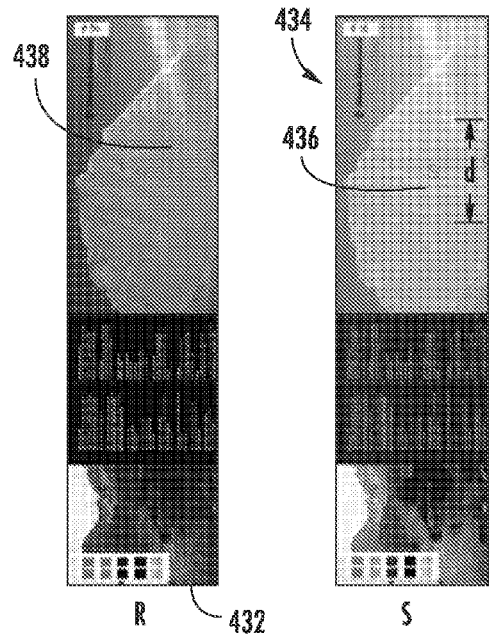
FIG. 8A is an example of the first source image after downsizing.
FIG. 8B is an example of the first captured digital image after downsizing.

As indicated by step 340 and further illustrated by FIG. 8, upon receiving digital source 32 and digital image 33, controller 28 downsizes and registers both digital source 32 and digital image 33 to form downsized digital source (R) 432 and downsized digital image (S) 434. Because controller 28 downsizes image 33, computational demands are lowered. When the defect of interest or the defect to be detected is a streak versus a band, controller 28 utilizes a different down scaling factor to accommodate the generally smaller width of the streak as compared to a band. When the defect of interest or the defect to be detected is a band or streak, controller 28 carries out a registration process (before or after downsizing) that matches the digital source 32 and the captured digital image 33 by skewing the captured digital image 33 to match the digital image. When the defect of interest or the defect to be detected is a dust line, an inverse registration process is applied to the digital source 32 by controller 28 so that the digital source 32 will match and more accurately register with the captured digital image 33 (before or after downsizing). In other embodiments, other down scaling and registration processes may be utilized.

Figure 9:
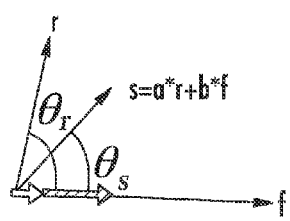
FIG. 9 is a vector diagram illustrating an example geometric relationship between a defect of interest f, the digital source r and the captured digital image s.
Figure 10:
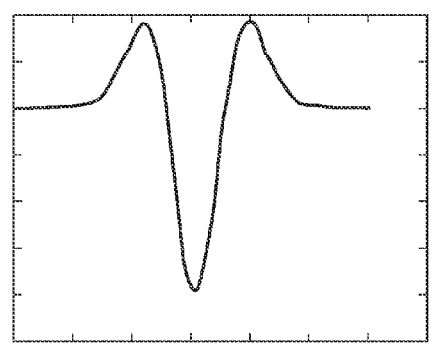
FIG. 10 is a graph illustrating an example second derivative of a gaussian which correspond to the shape of a band defect.

As indicated by step 350 and further illustrated by FIGS. 9 and 10, upon forming downsized digital source 432 and downsized digital image 434, controller 28 carries out a filtering operation on the captured digital image 434. The captured digital image 434 is a modification of the digital source: it is different in luminance levels, general contrast and includes some misregistration that remains after the registration process. In addition, the digital image may include print defects introduced during the printing of the digital source 434, and scan artifacts introduced during the digital capturing of output 30. With the filtering operation, controller 28 filters out the contributions of the original reference, and the other differences between the digital source and the digital image or digital source 432 such that the defects introduced during printing or digital capturing (scanning) remains.

In the example illustrated, as shown by FIGS. 8 and 9, controller 28 filters a smaller portion of digital image 432 rather than the entirety of image 432. In particular, controller 28 perform the filtering operation on a predefined window (s) 436 of pixels, wherein the window has length and width dimensions less than the length and width dimensions of the downsized image 434. Each window (s) 436 has a size chosen such that each window (s) 436 has a major dimension d greater than a maximum expected width of the defect being detected. To filter out contributions from the original reference or digital source 432, controller 28 uses a corresponding window (r) 438 of pixels in the digital source 432. Window (r) 438 has a size and location substantially identical to the size and location of window (s) 436.

Regardless of whether the defect of interest is either a band, a streak or a dust line, controller 28 carries out generally the same filtering process. FIG. 9 diagrammatically illustrates the filtering operation carried out by controller 28. In particular, each type of defect, whether it be a band, a streak or a dust line has a characteristic shape which may be represented by a vector f. For example, bands and streaks both have a characteristic cross-sectional shape of a second derivative of a gaussian similar to shown in FIG. 10. Dust lines have a shape similar to that of a delta function rather than a second derivative of a Gaussian. Controller 28 represents both the second derivative of a Gaussian and the delta function with a vector f (shown in FIG. 9) when detecting the various defects.

During the filtering process carried up a controller 28, controller 28 also represents the pixels in window (r) 438 as vector r in an N dimensional space and the pixels in window (s) 436 by a vector s in the N dimensional space. As shown by FIG. 9, vector s is a function of both the vector r, which is based upon the digital source 432, and the vector f, which is based upon the particular defect of interest being detected, where a and b are constants greater than zero. As further shown by FIG. 9, vectors r and s are angularly spaced from vector f in N dimensionsal space by $\Theta_r$ and $\Theta_s$, respectively. The degree to which the vector s satisfies the geometric relationship shown in FIG. 9 indicates a likelihood that the window s contains the defect of interest. In other words, the smaller the angular distance between vector s and vector f relatively to the angular distance of vector r from f, the more likely it is that the particular defect of interest exists within window (s).

As indicated by step or block 360, once controller 28 carries out the filtering operation on digital image 434, controller 28 compares a value based upon the resulting filtered image $F_w$ to a predetermined criteria or threshold TH. If the value based on the resulting filtered image $F_w$ satisfies or exceeds the threshold TH, the image F is determined or deemed to contain the defect of interest. In other embodiments, depending on the particular function applied to calculate the filtered image $F_w$, a conclusion that the filtered image $F_w$ contains the defect of interest occurs when the value based upon the filtered image $F_w$ has a value less than a threshold TH. In one embodiment, controller 28 may directly use the filtered image $F_w$. In another embodiment, controller 28 may apply other mathematical processes to the filtered image $F_w$ to arrive at the value that is used for step 360. For example, controller 28 may apply one or more mathematical weighting schemes to the filtered image $F_w$ to arrive at the value for use in step 360.

As indicated by step 370, if the value based upon the filtered image F satisfies a predetermined relationship with the threshold TH, controller 28 causes the operator to be alerted of the detected defect if the defect is a printing defect or inhibits or prevents an alert from being sounded if it is determined that the defect is merely a scanning error such as introduced by dust lines. Where controller 28 causes an alert, controller 28 may be configured to present an audible or visible signal or sound to the operator. In another embodiment, controller 28 may transmit a signal to another controller or another device which alerts the operator. In one embodiment, controller 28 may additionally or alternatively generate control signals halting ongoing printing by printer device 24 or making adjustments to print device 24.

As indicated by step 380, once controller 28 has made a determination as to whether the particular window (s) contains a printing defect, such as a band or streak, or a capture defect, such as a dust line, controller 28 repeats steps 350, 360, 370 for a different window of pixels in the same digital image 434. This process is repeated for each window of pixels forming digital image 434 until either an alert is provided (the detection of a band, streak or other defect of interest) or until a new captured digital image (s) of newly printed output (printed from the same reference image or a new reference image). In one embodiment, this process is repeated for multiple different windows which collectively span or cover an entirety of digital image 434. In another embodiment, this process is repeated for a single window containing all or a predetermined portion of digital image 434. In still another embodiment, this process is repeated for a predetermined number of windows at predetermined locations or predetermined portions of digital image 434, wherein the windows s do not collectively cover an entirety of digital image 434. For example, controller 28 may carry out the above detection process for particular windows of pixels at particular locations of digital image 434 where it is determined that print defects are more likely to be noticeable or are more likely to occur.

According to one embodiment, controller 28 carries out step 360 after each and every window of pixels in digital image 434 has been filtered. In another embodiment, controller 28 may alternatively carry out the filtering operation for each and every window of digital image 434 before any determination per step 360 is made. In such an embodiment, controller 28 would alternatively carry out step 361 time for all of the filtered windows $F_w$, collectively referred to as F.

In some embodiments, the size or scale of the window (s) of digital image 434 (and therefore the size of the corresponding window (r) of digital image 432) being analyzed by controller 28 may be varied to detect bands and streaks of varying widths. With this multiscale approach, the same portion of digital image 434 may be analyzed for defects multiple times using differently scale are differently sized windows (s). In some embodiments, both the digital reference or digital source 32 and the captured or scanned digital image 34 are also downsized to different sizes to better detect streaks or bands of different widths.

Figure 11:
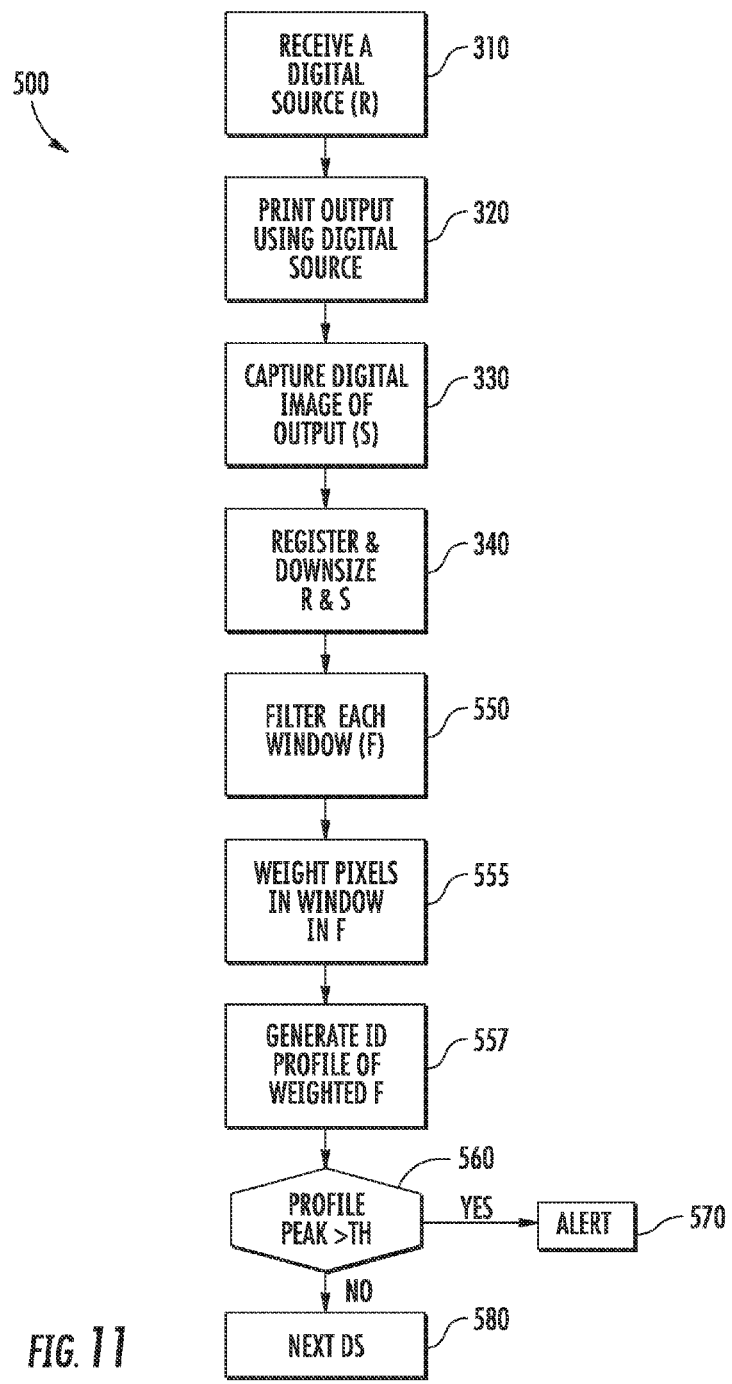
FIG. 11 is a flow diagram of a method for detecting a band defect according to an example embodiment.
Figure 13:
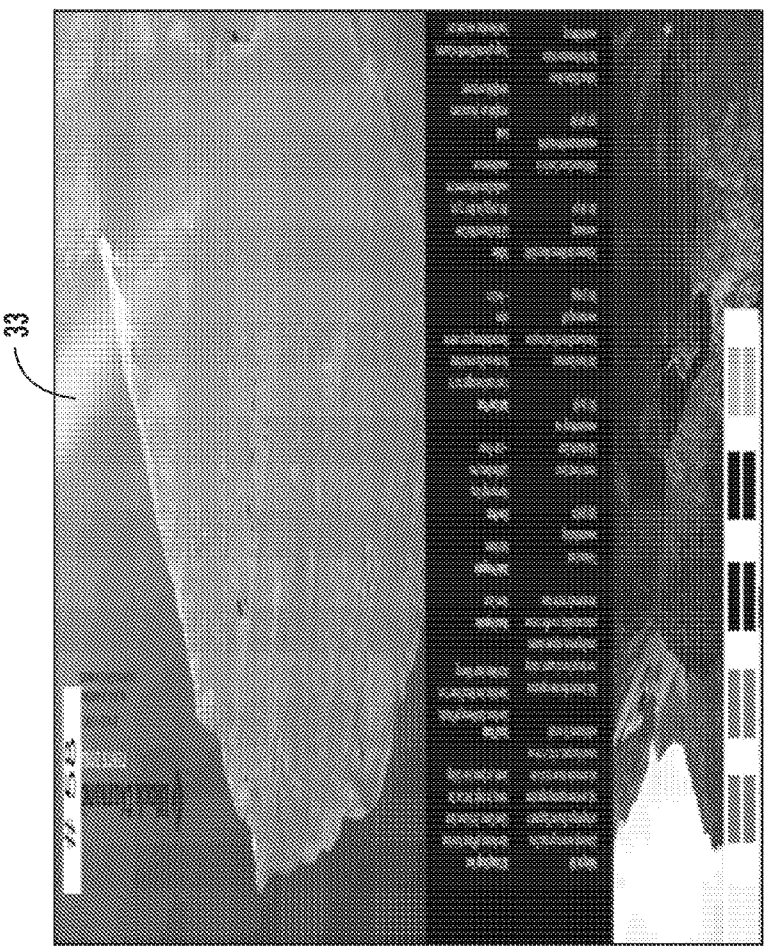
FIG. 13 is an example of a one-dimensional profile of the filtered captured digital image of FIG. 12 adjacent a corresponding original captured digital image.
Figure 12:
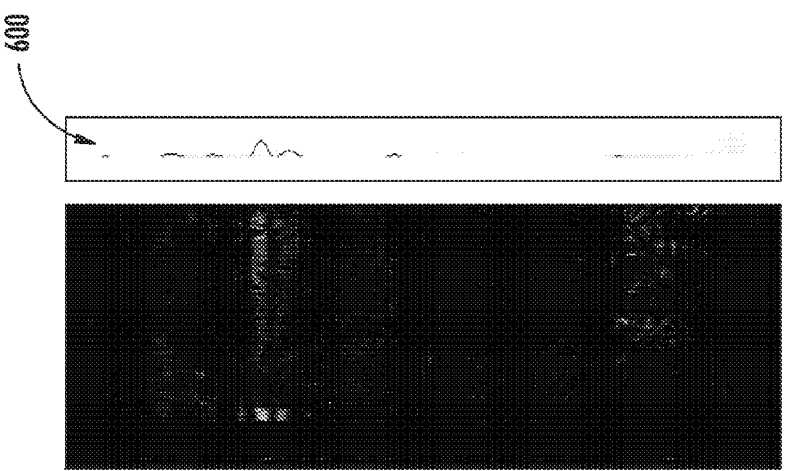
FIG. 12 is an example of a filtered captured digital image.

FIGS. 11-13 illustrate defect detection method 500, an example embodiment of method 300 specifically configured to detect band defects. For ease of discussion, those steps or blocks of method 500 which are identical to the steps of method 300 are numbered similarly. As indicated by block or step 550, method 500 carries out the filtering process on each and every window (s) that is to be analyzed. As noted above, in one embodiment, controller 28 may analyze a plurality of windows that collectively cover or encompass the entire digital image 33. As a result, controller 28 generates a filtered image F collectively composed of all of the individual filtered windows $F_w$, an example of which is shown in FIG. 12.

As indicated by step 555, controller 28 applies a function or mathematical operation to the filtered image F. In the example, controller 28 applies one or more weighting functions or operations to the pixels of filtered image F. In one embodiment, the pixels are weighted based upon one or both of print coverage and pixel location. For example, the visibility of a print defect may depend upon the printed image in the area of the defect. A zero coverage area where no or printing material on the print media is present or a full coverage area may result in a band being less visible. With zero coverage, a print defect cannot occur. With full coverage, a band is less likely because such a print defect is caused by screening artifacts. In high activity areas, such as near edges or on very textured areas of an image, a band will also be less visible as compared to other areas of an image.

According to one embodiment, controller 28 applies a heuristic weight matrix to assign weight to image pixels based upon pixel location. An example of such a heuristic weight matrix W1 is as follows:

$$W1_{i,j}=1-4*(R_{i,j}-\tfrac{1}{2})^2, \text{wherein}$$

W is a weight to be applied to a particular pixel at coordinates i,j;
$R_{i,j}$ is the value of the reference image location (i,j); and
$0<W1_{i,j}<1$.

According to another embodiment, W1ij is zero the reference is white in this region, (if Rij>0.98), otherwise, W1ij=1. In yet another embodiment, W1ij=1 for all of the regions.

According to one embodiment, controller 28 applies a second weight matrix based upon print coverage. An example of such a weight matrix W2 is as follows:

$$W2=\text{dilate}(\text{sobel}(R)>T), \text{wherein}$$

T is a predefined threshold;
sobel is a Sobel filter; and
W2 is either a 0 or 1, where W has a 1 value in high activity areas and near the edges.

To apply both weight matrices to filtered image F, controller 28 computes a bit wise multiplication of W1 and the inverse of W2: W=W1·W2'. In other embodiments, other weight matrices may be applied.

As indicated by step 557, to assist in determining whether the weighted filtered image F includes sets of captured pixels having characteristics sufficiently close to f such that they can be properly characterized as a band (the defect of interest), controller 28 generates a one-dimensional profile of the weighted filtered image F. In the example being described, the one-dimensional profile, prof, is computed according to the following:

$$\text{prof}=\Sigma_x(W\cdot*F)/\Sigma_x(W).$$

One example of a one-dimensional profile 600 for an example filtered image F is shown in FIG. 13 next to the corresponding capture digital image 33 (the captured digital image prior to downsizing). Thereafter, as indicated by step 570, controller 28 determines whether portions of the one-dimensional profile 600 satisfy a threshold TH. In particular, controller 28 carries out a peak detection procedure to identify peaks in the profile 600. Those peaks that are sufficiently large are deemed by controller 28 to be bands. As indicated by step 570, if at least one peak is detected, controller 28 causes the operator to be alerted of the detected defect if the defect is a printing defect. In some embodiments, different alarms or alerts may be generated based on the number of peaks or height of the peak or peaks to indicate severity of the defects in the output. Where controller 28 causes an alert, controller 28 may cause an audible or visible signal or sound to be presented to the operator. In another embodiment, controller 28 may transmit a signal to another controller or another device which alerts the operator. In one embodiment, controller 28 may additionally or alternatively generate control signals halting ongoing printing by printer device 24 or making adjustments to print device 24. As indicated by step 580, it controller 28 determines that profile 600 does not include any peaks having a sufficient size so as to satisfy threshold TH, controller 28 proceeds to analyze the image brother defects or proceeds to analyze output 30 based upon a different digital source.

Figure 14:
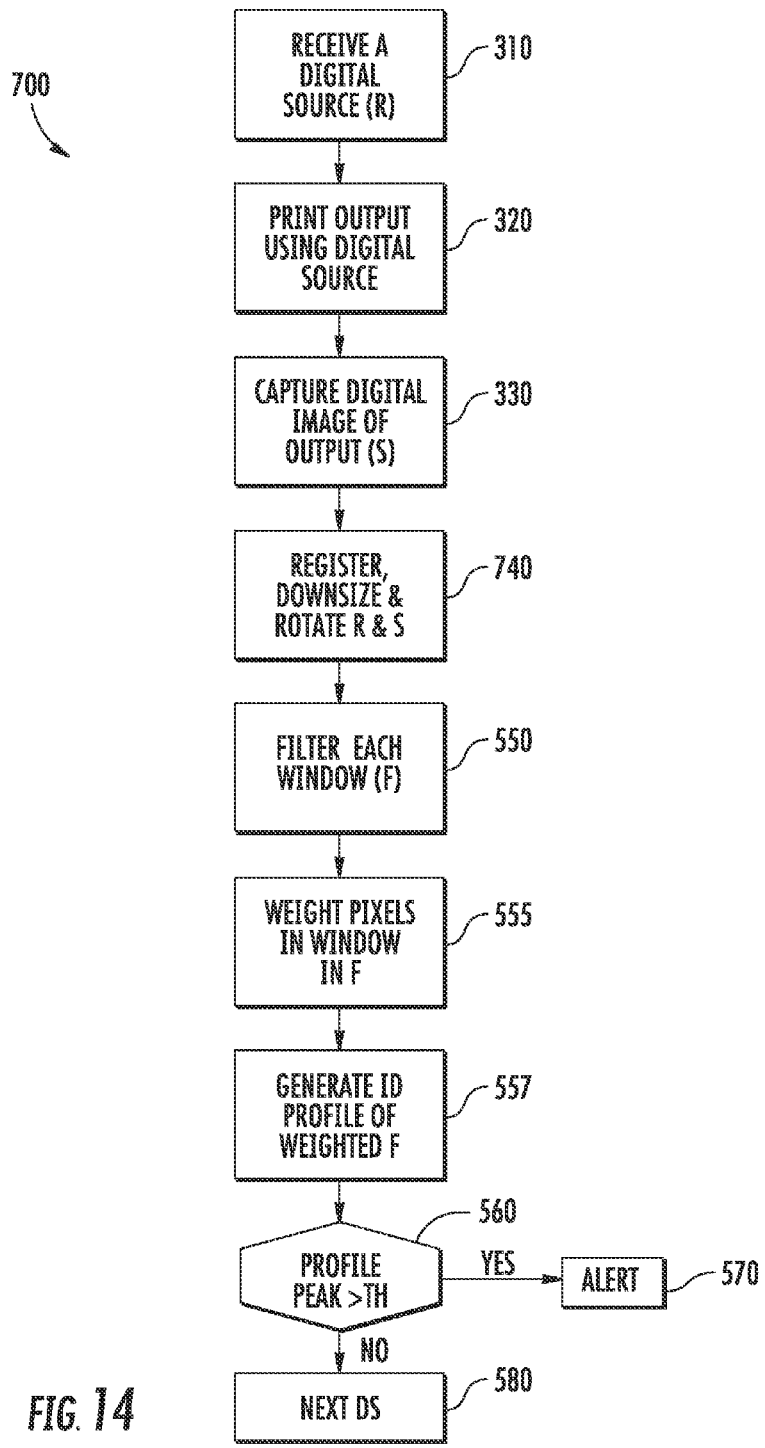
FIG. 14 is a flow diagram of a method for detecting a streak defect according to an example embodiment.

FIG. 14 illustrates defect detection method 700, an example embodiment of method 300 specifically configured to detect streak defects. For ease of discussion, those steps or blocks of method 700 which are identical to the steps of method 500 are numbered similarly. As shown by FIG. 14, method 700 is substantially similar to method 500 which is used to detect bands except for step 740 which replaces step 540. As during step 540, controller 28 registers and downsizes the digital source 32 and the captured digital image 33 (shown in FIG. 1). As compared to the downsizing which takes place in step 540, controller 28 downsizes both the digital source 32 and the captured digital image 33 to a different extent due to the width of the streak being different than the expected width of a band.

As further shown by FIG. 14, controller 28 additionally rotates the source and captured or scanned digital images (before or after registration and downsizing) before the filtering operations of step 550 are carried out. In particular, because a streak is perpendicular to the direction of a band, the source or reference image and the captured digital image are both rotated 90 degrees prior to such filtering. In other embodiments, depending upon the direction of scan or digital image capture, rotation may be omitted. The remaining steps of method 700 are substantially identical to the steps of method 500 except that in step 570, the alert is carried out in response to a streak being detected.

Figure 15:
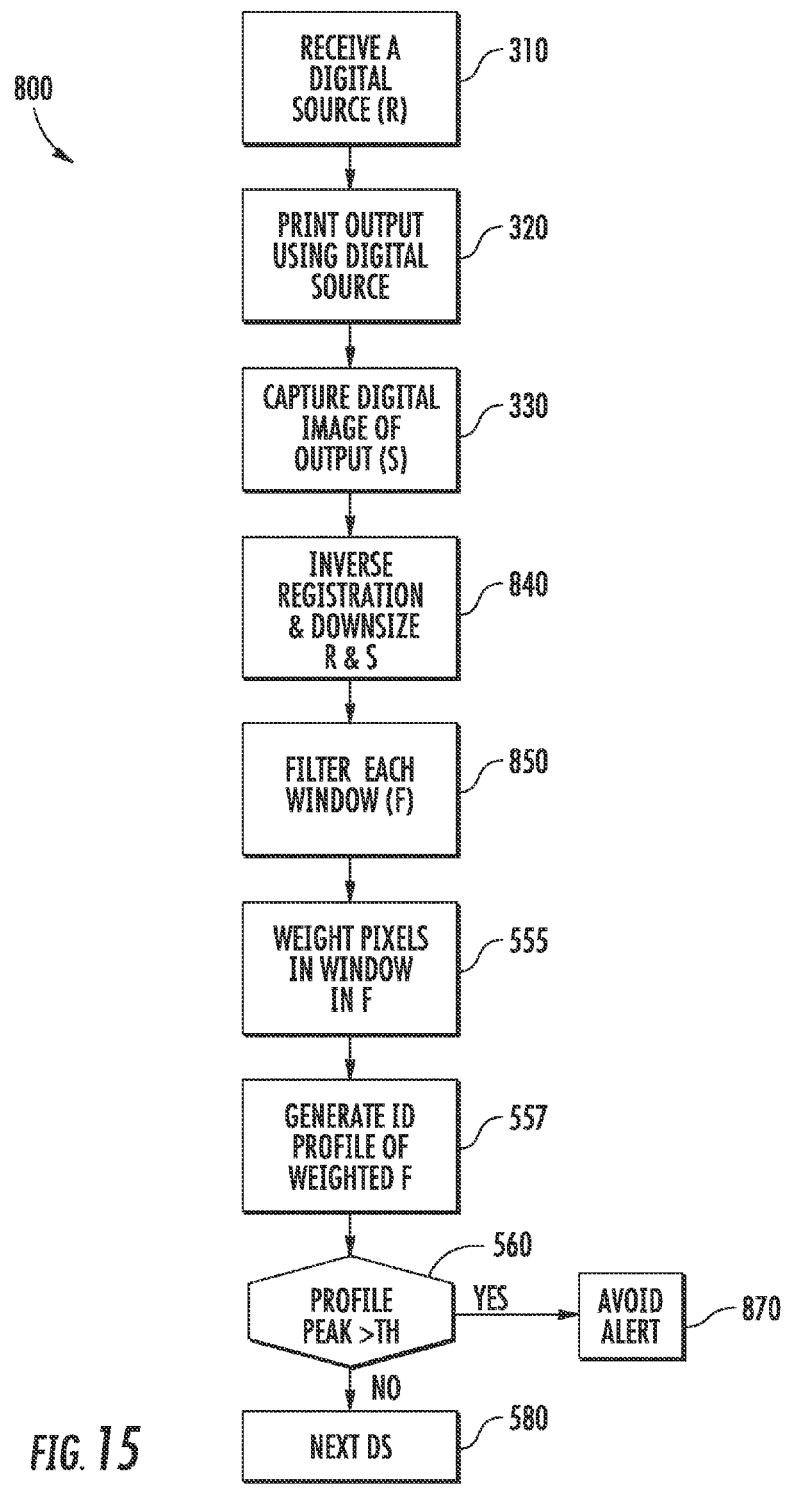
FIG. 15 is a flow diagram of a method for detecting a dust flying defect according to an example embodiment.

FIG. 15 illustrates defect detection method 800, an example embodiment of method 300 specifically configured to detect dust line defects. For ease of discussion, those steps or blocks of method 800 which are identical to the steps of method 700 are numbered similarly. As shown by FIG. 14, method 800 is substantially similar to method 700 which is used to detect streaks except for steps 840, 850 and 870 which replace steps 740, 550 and 570, respectively. As during step 740, controller 28 downsizes and rotates the digital source 32 and the captured digital image 33 (shown in FIG. 1). As compared to the downsizing which takes place in step 540, controller 28 downsizes both the digital source 32 and the captured digital image 33 to a greater extent due to the width of the streak being different than the expected width of a band. Like streaks, dust lines are also generally vertical. In other embodiments, depending upon the direction of scan or digital image capture, rotation may be omitted.

During the registration process that is carried out by the controller 28 for the detection of bands and streaks, the source image is skewed with respect to the captured digital image for matching. However, dust lines appear as straight lines in the captured digital image. In those embodiments in which the digital source and the captured digital image have already been registered for the detection of bands and/or streaks, controller 28 additionally carries out an inverse registration upon the digital source to remove any previous skewing to facilitate detection of dust lines. In those embodiments in which the digital source and the digital image have not been previously registered with skewing, a direct registration without skewing of the digital source may be carried out by controller 28 for the detection of dust lines.

Step 850 is substantially identical to step 550 except that a different filter function is carried out the controller 28 due to the different shape of dust lines as compared to the shape of a streak or band. In particular, controller 28 carries out a delta function rather than the second derivative of a gaussian.

In step 870, in those instances where the profile peak is greater than the predetermined threshold in step 560, controller 28 determines that what would otherwise be characterized as a print defect is actually dust lines, a digital capture or scanning error caused by dust particles on the sensing or optical elements of the digital capture device 26. As a result, controller 28 avoids or prevents any alert being made due to the detected dust line defect. In other words, those defects which would otherwise result in a false alert or false alarm by this or other inspection systems, possibly causing the printing system to be temporarily shut down, are identified and recorded as dust lines and are otherwise ignored.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
a printing device;
an in-line digital capture device; and
at least one controller configured to (1) receive a digital source; (2) receive a digital image of an output of the digital source printed by the printing device; (3) carry out a comparison of the digital source and the digital image to detect a given defect in the output resulting during printing of the digital source by the printing device; and (4) control an alert to either an operator or to an automatic correction mechanism based on the detected given defect, wherein the comparison comprises:
registering the digital source and the digital image;
applying at least one filter which is based on characteristics of the given defect to the registered digital source and digital image to form a filtered image; and
comparing a function of the filtered image to a given threshold to determine presence of the given defect within the output.

2. The apparatus of claim 1, wherein the function is region dependent.

3. The apparatus of claim 1, where the given defect is either a band or streak.

4. The apparatus of claim 3, where the filters used on the registered images comprise one or more from the following:

$$<s,f>, <r,f>, |\cos \Theta_s|, |\cos \Theta_r|, |\cos \Theta_s| - |\cos \Theta_r|,$$

$$d_1 = \min(<s,f>, kC_1)/<r,f>+C_1;$$

$$d_2 = \max(|\cos \Theta_s| - |\cos \Theta_r|, 0), \text{ where:}$$

s is a vector representing pixels in the first window of pixels in the digital image;
r is a vector representing pixels in the second window of pixels in the digital source;
f is a vector corresponding to a shape of the given defect;

$$|f| = 1;$$

$\Theta_s$ is the angle between s and f;
$\Theta_r$ is the angle between r and f;
$C_1$ and k are predefined constants that limit the range of values $d_1$;
$<s,f>$ is an inner product of s and f; and
$<r,f>$ is an inner product of r and f.

5. The apparatus of claim 1, where the function is $d_1 \cdot {}^* d_2$.

6. The apparatus of claim 1, where the function is based upon a learning algorithm on examples of the given defect.

7. The apparatus of claim 1, wherein the comparison comprises downsizing of at least a portion of each of the digital source and the digital image along orthogonal axes at least once, wherein the at least one filter is applied to the downsized digital source and digital image.

8. The apparatus of claim 1, wherein the comparison comprises:
   downsizing at least a portion of each of the digital source and the digital image along orthogonal axes;
   filtering a first window in the downsized digital image using a second corresponding window in the downsized digital source to form a filtered image $F_w$, wherein the filtered image $F_w$ comprises $d_1 \cdot {}^* d_2$, where $d1 = \min(<s,f>, kC_1)/<r,f> + C_1;$ $d2 = \max(|\cos \Theta_s| - |\cos \Theta_r|, 0);$ where:

s is a vector representing pixels in the first window of pixels in the digital image;
   r is a vector representing pixels in the second window of pixels in the digital source;
   f is a vector corresponding to a shape of the given defect;

$|f| = 1;$ $\Theta_s$ is the angle between s and f;
   $\Theta_r$ is the angle between r and f;
   $C_1$ and k are predefined constants that limit the range of values $d_1$;
   $<s,f>$ is an inner product of s and f; and
   $<r,f>$ is an inner product of r and f;
   comparing a value based on the filtered image $F_w$ to a predefined threshold to determine whether the operator should be alerted.

9. The apparatus of claim 7, wherein the at least one controller is configured to carry out the comparison for each of a plurality of different windows in the digital image which correspond to a plurality of different windows in the digital source.

10. The apparatus of claim 8, wherein the plurality of different windows in the digital image collectively include all pixels of the digital image.

11. The apparatus of claim 7 wherein comparing the filtered image $F_w$ to a predefined threshold comprises generating a one-dimensional profile based at least in part upon the filtered image $F_w$ and comparing peaks of the one-dimensional profile to the predefined threshold.

12. The apparatus of claim 7 further comprising weighting pixels of the filtered image $F_w$ based upon one or more characteristics of the pixels in the digital source.

13. The apparatus of claim 11, wherein the weighting of pixels is based upon print coverage, where the weighting $W1_{i,j}$, comprises $1 - 4 {}^* (R_{i,j} - 1/2)^2$, where
   $R_{i,j}$ is a pixel in the digital source;
   wherein the weighting of pixels based upon pixel location, W2, comprises dilate(sobel(R)>T); where
   T is a predefined threshold;
   sobel is a sobel filter; and
   W2 is a member of the set $\{0,1\}$, with 1 being near high activity or textured areas and near edges, and wherein a collective weighting W is applied to the pixels of the filtered image Fw, wherein $W = W1 \cdot {}^* W2'$.

14. The apparatus of claim 13 wherein comparing the filtered image $F_w$ to a predefined threshold comprises generating a one-dimensional profile, prof, of the filtered image $F_w$ and comparing peaks of the one-dimensional profile to the predefined threshold and wherein $\text{prof} = \Sigma_x(W \cdot {}^* F)/\Sigma_x(W)$.

15. The apparatus of claim 7, wherein f is a vector corresponding to a second derivative of a Gaussian.

16. The apparatus of claim 7, wherein the comparison further comprises rotating the digital image and the digital source by 90 degrees.

17. The apparatus of claim 7, wherein the comparison comprises applying an inverse registration process to the digital source to match the digital image, wherein f is a vector corresponding to a delta function.

18. A method comprising:
   receiving a digital source;
   receiving a digital image of an output of the digital source printed by a printing device;
   carrying out a comparison of the digital source and the digital image to detect a defect in the output resulting during printing of the digital source by the printing device; and
   controlling an alert to either an operator or to an automatic correction mechanism based on the detected defect, wherein the comparison comprises:
   registering the digital source and the digital image;
   applying at least one filter which is based on characteristics of the defect to the registered digital source and digital image to form a filtered image; and
   comparing a function of the filtered image to a given threshold to determine presence of the defect within the output.

19. The method of claim 18 further comprising:
   printing the digital source with the printing device to generate the output; and
   capturing the digital image of the output with a digital capture device, wherein the at least one filter comprises:

$d_1 \cdot {}^* d_2$, where $d1 = \min(<s,f>, kC_1)/<r,f> + C_1;$ $d2 = \max(|\cos \Theta_s| - |\cos \Theta_r|, 0);$ where:

s is a vector representing pixels in the first window of pixels in the digital image;
   r is a vector representing pixels in the second window of pixels in the digital source;
   f is a vector corresponding to a shape of the defect;

$|f| = 1;$ $\Theta_s$ is the angle between s and f;
   $\Theta_r$ is the angle between r and f;
   $C_1$ and k are predefined constants that limit the range of values $d_1$;
   $<s,f>$ is an inner product of s and f; and
   $<r,f>$ is an inner product of r and f;
   comparing a value based on the filtered image $F_w$ to a predefined threshold to determine whether the operator should be alerted.

20. A method comprising:
   printing a digital source with a printing device to generate an output;
   capturing a digital image of the output with a digital capture device;
   for each of a plurality of different windows of pixels in the digital image and a corresponding plurality of windows in the digital source, carrying out, with at least one controller, a comparison of the digital source and the digital image to detect a defect in the output resulting during printing of the digital source by the printing device; and alerting an operator of the detected defect based on the comparison, wherein the comparison comprises:

downsizing at least a portion of each of the digital source and the digital image along orthogonal axes;

filtering a first window in the downsized digital image using a second corresponding window in the downsized digital source to form a filtered image $F_w$, wherein the filtered image $F_w$ comprises $d_1 \cdot {}^* d_2$, where $$d1 = \min(<s,f>, kC_1)/<r,f> + C_1;$$

$$d2 = \max(|\cos \Theta_s| - |\cos \Theta_r|, 0); \text{ where:}$$

s is a vector representing pixels in the first window of pixels in the digital image;

r is a vector representing pixels in the second window of pixels in the digital source;

f is a vector corresponding to a shape of the defect of interest;

$$|f| = 1;$$

$\Theta_s$ is the angle between s and f;

$\Theta_r$ is the angle between r and f;

$C_1$ and k are predefined constants that limit the range of values $d_1$;

$<s,f>$ is an inner product of s and f; and $<r,f>$ is an inner product of r and f;

weighting of pixels based upon print coverage, wherein $W1_{i,j}$ comprises $1 - 4^*(R_{i,j} - 1/2)^2$, where $W1_{i,j}$ is a first weight for pixel i, j;

$R_{i,j}$ is a pixel in the digital source;

weighting of pixels based upon pixel location, wherein W2 comprises dilate(sobel(R)>T); where T is a predefined threshold;

sobel is a sobel filter; and

W2 is a member of the set {0,1}, with 1 being near high activity or textured areas and near edges, and wherein a collective weighting W is applied to the pixels of the filtered image Fw, wherein $W = W1 \cdot {}^* W2$;

generating a one-dimensional profile, prof, of the filtered image F, wherein $F = \Sigma F_w$ and wherein $\text{prof} = \Sigma_x W \cdot {}^* F)/\Sigma_x (W)$; and comparing peaks of the one-dimensional profile, prof, to a predefined threshold to determine whether the operator should be alerted.

\* \* \* \* \*

UNITED STATES PATENT AND TRADEMARK OFFICE
CERTIFICATE OF CORRECTION

PATENT NO. : 8,654,369 B2
APPLICATION NO. : 13/185226
DATED : February 18, 2014
INVENTOR(S) : Hadas Kogan et al.

It is certified that error appears in the above-identified patent and that said Letters Patent is hereby corrected as shown below:

In the Claims

In column 14, line 15, in Claim 20, delete "W2;" and insert -- W2'; --, therefor.

In column 14, line 17, in Claim 20, delete "W" and insert -- (W --, therefor.

Signed and Sealed this
Nineteenth Day of August, 2014

Michelle K. Lee
*Deputy Director of the United States Patent and Trademark Office*